United States Patent [19]
Van Roekel et al.

[11] Patent Number: 5,767,796
[45] Date of Patent: Jun. 16, 1998

[54] NAVIGATION SYSTEM FOR A VEHICLE

[75] Inventors: Jauke Van Roekel, Laufdorf; Lutz Hofmann, Bischoffen, both of Germany

[73] Assignee: U.S Philips Corporation, New York, N.Y.

[21] Appl. No.: 734,010

[22] Filed: Oct. 18, 1996

[30] Foreign Application Priority Data

Oct. 19, 1995 [DE] Germany .......... 195 38 894.1

[51] Int. Cl.$^6$ .......... G08G 1/123
[52] U.S. Cl. .......... 340/988; 340/995
[58] Field of Search .......... 340/966, 965, 340/988, 990, 995, 425.5, 439, 407.1, 825.19, 825.46

[56] References Cited

U.S. PATENT DOCUMENTS

| | | | |
|---|---|---|---|
| 3,478,351 | 11/1969 | Fenton | 340/425.5 |
| 3,736,551 | 5/1973 | Hirsch | 340/407.1 |
| 3,902,687 | 9/1975 | Hightower | 340/965 |
| 4,758,959 | 7/1988 | Thoone et al. | 364/454 |
| 4,847,769 | 7/1989 | Reeve | 364/424.02 |
| 4,908,619 | 3/1990 | Bala et al. | 340/966 |
| 5,452,217 | 9/1995 | Kishi et al. | 340/995 |
| 5,530,330 | 6/1996 | Baiden et al. | 318/580 |

FOREIGN PATENT DOCUMENTS 3112000  5/1991  Japan .

Primary Examiner—Brent A. Swarthout

[57] ABSTRACT

The invention relates to a navigation system for a vehicle with a navigation unit (1) in which navigation information is generated and which comprises at least one motional element (10, 11) which can be moved and/or vibrated and a control unit (8) which receives the navigation information at its input side and whose output signal controls the movement and/or vibration of the motional element (10, 11) as control information.

4 Claims, 1 Drawing Sheet

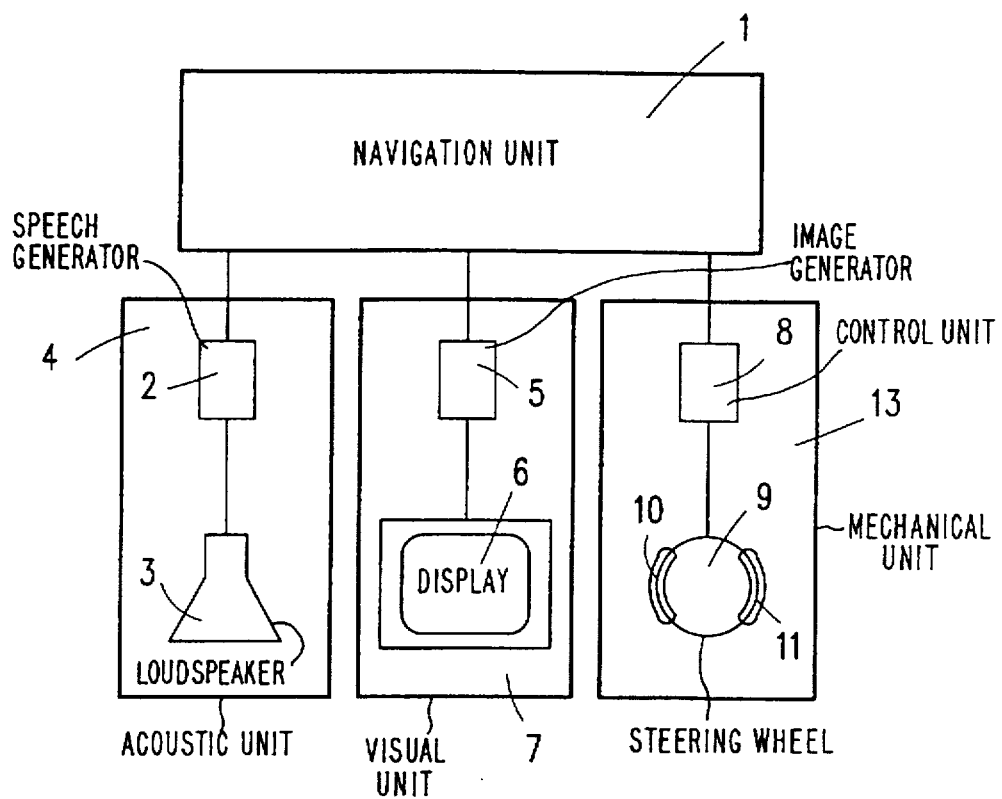

NAVIGATION SYSTEM FOR A VEHICLE

BACKGROUND OF THE INVENTION

The invention relates to a navigation system for a vehicle with a navigation unit in which navigation information is generated.

Such a navigation system is described in U.S. Pat. No. 4,758,959. The navigation information generated in the navigation unit is transmitted to the driver acoustically by means of a speech generator and a loudspeaker and visually by means of an image generator and a picture screen. The visual transmission of the navigation information has the disadvantage that the driver must take his eyes off the road, which is a traffic safety risk. When the navigation information is transmitted acoustically, the driver can take note of it without taking his eyes off the road. It may easily happen, however, that he fails to note the acoustically transmitted navigation information when he is in discussion with a passenger or with somebody else via a car telephone.

OBJECTS AND SUMMARY OF THE INVENTION

It is an object of the invention to provide a navigation system for a vehicle which is certain to transmit the navigation information to the driver also when his acoustic and visual perception capabilities are limited.

According to the invention, this object is achieved by at least one motional element which is movable and/or vibratable by means of a control unit which receives the navigation information at an input side and whose output signal serves as control information which controls the movement and/or vibration of the motional element.

The navigation information generated in the navigation unit is first supplied to the control unit. The navigation information is processed further in this control unit and converted into control information which is available at the output of the control unit. This control information controls the movement and/or vibration of the motional element. The navigation information is contained in the nature of the movement and/or vibration of the motional element. The driver of the vehicle can recognize the navigation information by touching the notional element, for example with his hand, and detecting the characteristic nature of the movement and/or vibration of this element.

Such a navigation system has the advantage that the driver can absorb the navigation information without taking his eyes off the road. At the same time, he can still use his hearing for conversing with a passenger, using the car telephone, if present, or listening to music on the car radio.

An embodiment of the invention is characterized in that the navigation information of the navigation system is converted by the control unit and the motional element into rotary movements of the steering wheel.

For example, the steering wheel is given a rotary pulse to the right by the control unit and the motional element if the information to be conveyed to the driver is that he should turn right at the next opportunity. This rotary pulse to the right is recognized by the driver, who has his hands on the steering wheel, by means of his tactile sense. The angle of the rotary pulse must be chosen to be very small for reasons of traffic safety. It is advantageous to choose the angle of rotation of the rotary pulse to be smaller than the play in the steering system, so that the rotary pulse does not change the driving direction of the vehicle.

Further embodiment of the invention is characterized in that the motional element is arranged at the steering wheel, while a further advantageous embodiment of the invention is characterized in that two motional elements are arranged at the steering wheel, one on the left of the steering wheel and one on the right of the steering wheel.

If it is to be communicated to the driver that he must turn right at the next opportunity, this may be done, for example, through a movement and/or vibration of the motional element arranged on the left of the steering wheel. This is advantageous because the rotation of the steering wheel to the right is achieved substantially by the force of the driver's left hand.

Further advantageous versions of this embodiment are characterized in that the navigation information controls the amplitude, frequency, or modulation of the movement and/or vibration of the motional element via the control unit.

The amplitude, frequency, and modulation control of the movement and/or vibration of the motional element renders it possible to communicate to the driver various pieces of navigation information simultaneously, for example distance information, angle information, or numerical information.

A further advantageous embodiment of the invention is characterized in that the navigation information controlling the amplitude of the movement and/or vibration of the motional element is distance information. A piece of distance information may be, for example, the distance to an approaching junction. It is advantageous then when the amplitude of the movement and/or vibration of the motional element increases with a decreasing distance, for example to the junction. The increasing amplitude warns the driver that the approaching event, here the junction, comes closer and closer.

A further advantageous embodiment of the invention is characterized in that the navigation information controlling the frequency of the movement and/or vibration of the motional element is angular information.

A frequency of 50 Hz could tell the driver, for example, that he is to take a 90° turn-off at the next opportunity, whereas a frequency of 25 Hz means that the driver must take a 45° turn-off at the next opportunity.

A further advantageous embodiment of the invention is characterized in that the navigation information controlling the modulation of the movement and/or vibration of the motional element is numerical information.

The modulation of the movement and/or vibration of the motional element may communicate to the driver, for example, at which of the next junctions he is to turn off. Thus, for example, two pulses of a certain frequency and amplitude may tell the driver that the event, for example changing direction, must take place at the second crossing from here, while three pulses of a given frequency and amplitude point to a change of direction at the third crossing from here.

Summarizing, the navigation information is always transmitted to the driver via the nature of the movement and/or vibration of the motional element. It may be made dependent on the individual learning capacity of the driver which characteristic quantities of the movement and/or vibration of the motional element transmit which information to the driver. A training phase is necessary in any case, during which the driver is to learn which characteristic quantities of the movement and/or vibration of the motional element transmit which navigation information to him. Once accustomed to the system, the driver will automatically recognize the navigation information without conscious thinking.

BRIEF DESCRIPTION OF THE DRAWING

An embodiment of the invention will be explained in more detail below with reference to the sole Figure of the drawing in which a navigation system of a vehicle constructed in accordance with the present invention is depicted.

DETAILED DESCRIPTION OF THE PREFERRED EMBODIMENTS

The sole Figure of the drawing shows a navigation system of a vehicle with a navigation unit 1 in which navigation information is generated. This navigation information comprises, for example, data on the position of the vehicle or instructions on the driving direction in order to reach a desired destination. This navigation information is to be communicated to the driver of the vehicle. A first possibility offered to this end is an acoustic unit 4 which transmits the navigation information to the driver by acoustic means. The acoustic unit 4 comprises a speech generator 2 which receives the navigation information from the navigation unit 1. This speech generator 2 controls a loudspeaker 3 which converts the navigation information into acoustically perceptible sound waves. A further possibility offered is a visual unit 7 which transmits the navigational information to the driver by visual means. The visual unit 7 comprises an image generator 5 which receives the navigation information from the navigation unit 1. The image generator 5 controls a display screen 6 on which the driver of the vehicle can read the-graphically depicted navigation information. A third possibility offered is a mechanical unit 13 which converts the navigation information into movement. The mechanical unit 13 comprises a control unit 8 which receives the navigation information from the navigation unit 1. The control unit 8 controls the movement and/or vibration of two motional elements 10 and 11 which are arranged at the steering wheel 9 of the vehicle. The navigation information is contained in the nature of the movement and/or vibration of the motional elements 10 and 11. The driver of the vehicle can recognize the navigation information by touching the motional elements 10 and 11 arranged at the steering wheel 9 and deriving from the nature of the movement and/or vibration of the motional elements what the navigation in information is. This recognition of the navigation information from the nature of the movement and/or vibration of the motional elements requires a training phase during which the driver of the vehicle learns the interrelationship between the nature of the movement and/or vibration of the motional elements 10 and 11 and the navigation information represented thereby.

The acoustic unit 4, the visual unit 7, and the mechanical unit 13 may be operated as desired individually or simultaneously by means of a selection switch (not shown). The driver can thus decide in which manner the navigation information generated in the navigation unit 1 is communicated to him, in dependence on the driving situation of the moment. For example, when the driver is in a parking lot and wants the navigation system to show him the driving route to a destination, he will advantageously select the visual unit 7. While driving, the driver will preferably select the acoustic unit 4 when he wants to be guided to a certain destination by the navigation system and does not want to talk with any passenger present and does not want to listen to music. However, when the driver does want to talk with a passenger or listen to music while driving to a destination, he will select the mechanical unit 13. He may then talk with his passenger or listen to music without being interrupted by acoustic signals from the navigation system. Neither does he have to take his eyes off the road in order to read the navigation information displayed on the screen 6 of the visual unit 7.

Possible characteristic quantities of the nature of the movement and/or vibration of the motional elements 10 and 11 from which the driver can recognize the navigation information are, for example, the amplitude, frequency, and modulation of the movement and/or vibration of the motional elements 10 and 11. The amplitude of the movement and/or vibration of the motional elements 10 and 11 is particularly suitable here for indicating a distance. Thus, for example, an amplitude of −20 dB could indicate that an event, for example an approaching junction, is 100 m away, while an amplitude of −15 dB indicates a distance of 50 m and an amplitude of −10 dB a distance of 5 m. The frequency of the movement and/or vibration of the motional elements 10 and 11 may advantageously be used for indicating an angle. Thus, for example, a frequency of 50 Hz may mean that a 90° turn-off is to be taken subsequently, while a frequency of 25 Hz indicates a 45° turn-off. The modulation of the movement and/or vibration of the motional elements 10 and 11 may advantageously be used for numerical information. Thus, for example, two pulses of a given amplitude and frequency may mean that the driver is to turn off at the second crossing from here, while three pulses indicate that he is to turn of at the third crossing from here.

We claim:

1. A navigation system for a vehicle, said system comprising:

generating means for generating navigational information;

a control unit, coupled to said generating means, for receiving said navigation information;

at least one motional element, coupled to said control unit, said motional element being at least one of movable and vibrational;

wherein said control unit, in order to advise the vehicle's driver of an upcoming location, varies the amplitude of said movement or vibration of said at least one movable element as a function of the vehicle's distance from said upcoming location.

2. A navigation system for a vehicle, said system comprising:

generating means for generating navigational information;

a control unit, coupled to said generating means, for receiving said navigation information;

at least one motional element, coupled to said control unit, said motional element being at least one of movable and vibrational;

wherein said control unit, in order to advise the vehicle's driver of an upcoming turn, varies the frequency of said movement or vibration of said at least one movable element as a function of the angle at which the vehicle should turn at said upcoming turn.

3. A navigation system for a vehicle, said system comprising:

generating means for generating navigational information;

a control unit, coupled to said generating means, for receiving said navigation information;

at least one motional element, coupled to said control unit, said motional element being at least one of movable and vibrational;

wherein said control unit, in order to advise the vehicle's driver to take an action at a particular upcoming location out of a plurality of upcoming locations, modulates the at least one movable element proportionally to the location of said particular upcoming location vis a vis the plurality of upcoming locations.

4. The navigation system as claimed in claim 3, wherein the at least one movable element modulates an integer number of times corresponding to the location of said particular location out of said plurality of upcoming locations.

\* \* \* \* \*